United States Patent Office 3,284,419
Patented Nov. 8, 1966

3,284,419
POLY(PERCARBOXYLIC ACIDS)
Friedrich G. Helfferich, Berkeley, Calif., assignor to Shell Oil Company, New York, N.Y., a corporation of Delaware
No Drawing. Filed Mar. 23, 1961, Ser. No. 97,760
9 Claims. (Cl. 260—79.3)

This invention relates to percarboxylic acids in a polymeric form which makes them more useful and economical in the application in which percarboxylic acids are used.

Percarboxylic acids have many uses. They can, for example, be employed for epoxidizing or hydroxylating ethylenic compounds, depending upon the structure of the ethylenic compound and the reaction conditions employed. In these reactions the percarboxylic is used in solution in the corresponding carboxylic acid or other suitable organic solvent. It is often difficult to achieve high conversion in these reactions and recovery of the product can involve serious problems. There is also the danger of explosion in the manufacture and handling of organic solutions of percarboxylic acids.

These disadvantages would be materially reduced if not entirely eliminated if the reactions could be carried out with a solid form of percarboxylic acid that could be used in column operations where staging which favors high conversions can be economically achieved while the separation of the spent carboxylic reagent from the reaction products is simplified. Explosion hazard would also be minimized. This suggests that percarboxylic acids made by reacting cation resin exchanges which contain carboxylic acid groups with hydrogen peroxide be used for the reactions instead of the solutions of peracid heretofore employed. Unfortunately it has been found that such desirable poly (percarboxylic acids) cannot be made in this way. Even when a large excess of hydrogen peroxide is employed and sulfuric acid is added as catalyst, little, if any, conversion of the carboxyl groups of carboxylic cation exchange resins could be obtained under the conditions used for making percarboxylic acids in homogenous solution. Raising the temperature to 45° C. and employing contact times as long as 24 hours still failed to give resins containing sufficient percarboxylic acid groups to be useful on a practical scale.

It is an important object of the present invention to provide poly(percarboxylic acids) in solid form which can be successfully used in place of the percarboxylic acid solutions heretofore employed. A special object is the provision of a new class of cation exchange resins having a high proportion of percarboxylic acid groups. Another object is to provide water-insoluble, particulate, poly(percarboxylic acid) resins which also contain strongly dissociated, hydrophilic acid groups which impart desirable characteristics to the peracid resin. A further object is the provision of poly(percarboxylic acid) resins which are advantageous in reactions such as hydroxylation and can be readily regenerated in peracid form after such reaction and used over again.

These and still other objects and advantages of the invention are attained by a novel class of new polymeric peracid resins which contain carboxylic groups together with strongly dissociated hydrophilic acid groups in controlled proportions, a substantial portion of the carboxylic groups being in percarboxylic form.

Apparently, the fact that carboxylic acid resins do not appreciably react with hydrogen peroxide containing sulfuric acid catalyst to form percarboxylic acid groups in significant amounts is due to failure of the peroxide and sulfuric acid catalyst to achieve adequate contact with a sufficient proportion of the carboxylic acid groups of the resin. The carboxylic acid resins in hydrogen form swell very little in aqueous solution because the functional groups are only weakly dissociated. Hydrogen peroxide and the sulfuric acid catalyst thus have comparatively little access to the carboxylic groups within the resin. The oxidation of the carboxylic acid groups on the outer shells of the resin makes the resin even more impenetrable since the percarboxylic acid groups are even less dissociated and less hydrophilic than the carboxylic acid groups. Conversion of the carboxylate anions of the resin to the sodium salt form makes these groups more highly dissociated and hydrophilic. This does not significantly improve the conversion to the desired percarboxylic acid groups, however, possibly because of the inherent instability of the percarboxylate ion.

It has been found that by introducing sufficient strongly dissociated, hydrophilic acid groups into the poly(carboxylic acid) resin, one can obtain a resin which will react readily with hydrogen peroxide to convert a substantial portion of the carboxylic acid groups to percarboxylic acid groups and form a poly(percarboxylic acid) resin uniquely fitted for transfer of reactive oxygen to other compounds and then simple regeneration to its percarboxylic acid form. The success of these new poly(percarboxylic acid) resins is dependent upon the ratio of the strongly dissociated, hydrophilic acid groups present to the carboxylic acid groups in the resin. This ratio should be at least 0.1:1 but not greater than 4:1. If lower ratios are used, the rate of conversion of carboxylic acid groups to percarboxylic acid groups by oxidation with hydrogen peroxide will be too low for practical scale operation. If higher ratios are employed the effective capacity of the resin as an oxygen transfer agent will be too low for economically practical use. Ratios in the range of about 0.2:1 to about 1:1 are more advantageous with ratios of about 0.3:1 to about 0.6:1 being usually best for general use.

The new resins are characterized by the presence in the molecule of both carboxylic acid groups and percarboxylic acid groups. As a rule it is desirable that the ratio of percarboxylic acid groups to carboxylic acid groups be at least 0.25:1 and more advantageously at least 0.33:1. Ratios of the order of about 0.5:1 to about 1.5:1 are usually most suitable. Higher ratios than about 2:1 are more difficult to attain as they require the use of more concentrated hydrogen peroxide for the oxidation step which may result in damage to the resin unless carefully controlled. The products of the invention may thus be described as water-insoluble, solid resins having a hydrogen peroxide resistant matrix to which are chemically bound three different types of functional groups, namely, percarboxylic acid groups, carboxylic acid groups and strongly dissociated, hydrophilic acid groups, in the above-indicated ratios.

The strongly dissociated, hydrophilic acid groups which must be present in the new poly(percarboxylic acid) resins are those having a dissociation constant at 25° C. of at least 4 for the first hydrogen when in hydrogen ion form. Preferred groups are those having an acidity at least as strong as an acid of pK 2 where that pK is the negative logarithm to base ten of the acid dissociation constant of the acid calculated according to the equation $$K = \frac{[H][A]}{[HA]}$$

in which the brackets indicate concentrations in moles per liter for the hydrogen ion H, the acid anion A, and the acid HA. Most advantageous are the strongly acidic resins in which the pK of the strongly dissociated, hydrophilic group or groups is between 1 and about −2. Examples of suitable groups of this kind are, for instance, the sulfonic acid (—SO₃H), sulfuric acid ester (—O—SO₃H), phosphonic acid [—PO(OH)₂], phosphonous acid [—HP(OH)₂], phosphoric acid ester [—O—PO(OH)₂] and like groups. Mixtures of more than one of these types of groups may be present in the new resins instead of a single kind of strongly dissociated, hydrophilic acid group. These groups can be in the free acid form or in the form of salts which are non-reactive with hydrogen peroxide under the intended conditions of use. Of course there are groups reactive with hydrogen peroxide which are entirely suitable. For example, where phosphonous groups are used in preparing the resin they will be oxidized in the hydrogen peroxide treatment stage to phosphonic acid groups. Because of the catalytic effect of polyvalent heavy metal salts such as the iron, copper, chromium and like salts as accelerators of hydrogen peroxide decomposition, it is preferred to use alkali metal, ammonium, or alkaline earth metal salts when the salt form of the strongly dissociated, hydrophilic acid groups in the resins is desired. In any case it is important that the carboxylic acid group be in the hydrogen form. As a general rule it is preferable that both the carboxylic acid groups and the strongly dissociated, hydrophilic acid groups be in the hydrogen form. However, for certain applications, for instance where the substrate is acid sensitive, it may be desirable to use the resin with the strongly dissociated, hydrophilic acid groups in the foregoing salt form. An advantageous method of preparing such resins comprises oxidation of the resin having all acid groups in the hydrogen form to convert at least a portion of the carboxylic acid groups to percarboxylic acid groups and then neutralizing the strongly, dissociated, hydrophilic acid groups selectively by treating the peroxidized resin with an amount of dilute aqueous base which is stoichiometrically equivalent to the strongly dissociated, hydrophilic acid groups which are to be converted to salt form.

The new resins can be successfully produced in a number of different ways. They are most advantageously made with a hydrocarbon matrix since high resistance to hydrogen peroxide attack on the matrix can be achieved in this way. One suitable method of making such preferred resins is by copolymerization of an unsaturated carboxylic acid with a polymerizable unsaturated compound which is substituted by one or more of the strongly dissociated, hydrophilic groups which are to be introduced into the resin and then oxidizing the copolymer with hydrogen peroxide to form the required percarboxylic acid groups. The unsaturated carboxylic acid and the compound copolymerized therewith must be used in the proportions required for incorporating into the final resin carboxylic acid groups and strongly dissociated, hydrophilic groups in the previously indicated proportions.

Advantageous polymerizable unsaturated carboxylic acids for use in making the copolymers are the alpha, beta-ethylenic carboxylic acids of 3 to 12 carbon atoms per molecule. Monocarboxylic acids of this kind, such as acrylic acid, methacrylic acid, alpha-chloracrylic acid, alpha-ethylacrylic acid, and the like, are particularly suitable because the terminal methylene group makes them easily polymerizable. The more slowly polymerizing carboxylic acids of the same type in which the alpha,beta-ethylenic double bond is not linked to a terminal carbon atom can also be used, however. These include acids such as crotonic, alpha-methyl crotonic, alpha,beta-dodecylenic, cinnamic, and the like acids. One can also use, as starting materials for the new copolymers, polymerizable ethylenic carboxylic acids of 4 to 18 carbon atoms which have the ethylenic double bond further removed from the carboxyl group although these polymerize still more slowly. Typical examples of suitable acids of this type are vinyl acetic acid, oleic acid, etc. Vinyl benzoic acid is an especially useful acid of this type which has a high polymerization rate even though the ethylenic group is removed from the carboxyl group.

Instead of monocarboxylic acids one can use polycarboxylic acids of each of the foregoing types. Examples are maleic and fumaric acids, glutaconic acid, the vinyl phthalic acids and the like. Polyethylenic carboxylic acids, both mono- and polycarboxylic, can also be used although as a rule they are more advantageously employed in minor amounts only in conjunction with monoethylenic reactants in order to avoid excessive cross-linking of the resin. Suitable polyethylenic carboxylic acids for use in this way are muconic acid, linoleic acid, divinyl benzoic acid, etc.

Instead of the foregoing free carboxylic acids, their esters can be copolymerized and the polymer hydrolyzed later to form the required carboxylic acid groups in the resin. Esters of low boiling alcohols, such as methanol, ethanol, isopropanol, etc., are preferred because of the ease of removal of the alcohol from the hydrolyzed ester. Ethylenic compounds containing at least one strongly dissociated, hydrophilic group which can be copolymerized with the foregoing carboxylic acids or their esters to make resins oxidazable to the new poly(percarboxylic acid) resins are preferably compounds of 2 to 18 carbon atoms. They include ethylenic sulfonic acids such as vinyl sulfonic acid, allyl sulfonic acid, styrene sulfonic acid, etc. The corresponding and related ethylenic sulfuric acid and phosphoric acid esters as, for example, allyl acid sulfate (CH₂=CH—CH₂—O—SO₃H), cinnamyl acid phosphate

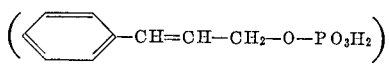

and the like can be similarly copolymerized with the ethylenic carboxylic acids, as can, for instance, the analogous ethylenic phosphonates.

Instead of copolymerizing the unsaturated carboxylic acid or ester with an ethylenic compound substituted by a strongly dissociated, hydrophilic group, the copolymerization can be carried out with another compound and the copolymer then reacted to introduce the required strongly dissociated hydrophilic group. For example, one can condense the disodium salt of benzaldehyde disulfonic acid with phenoxyacetic acid and formaldehyde using a small amount of sulfuric acid as catalyst, as described in U.S. Patent 2,729,607 for instance. Another suitable procedure comprises copolymerization of a ternary mixture of an acrylate or like ethylenic acid ester, styrene and a diolefin which will act as cross-linking agent. The copolymer can then be sulfonated with chlorosulfonic acid, for instance, and hydrolyzed. United States Patent 2,678,306 describes suitable methods of thus producing resins containing carboyxlic and sulfonic acid groups which can be converted to the new poly(percarboxylic acids) by oxidation with hydrogen peroxide when the proportions of the reactants are properly controlled so that the sulfonation introduces the required proportion of sulfonic groups previously indicated.

Other strongly dissociated, hydrophilic groups can be introduced into the initial copolymer instead of the sulfonic acid groups by using standard methods of synthesis. Thus one can chloromethylate the aromatic rings instead of sulfonating them and then convert the chloromethyl groups, either directly or after hydroysis to hydroxymethyl groups, to sulfuric acid or phosphoric acid ester groups. Alternatively the carboxylic acid copolymer can be reacted to introduce phosphonic acid groups by known reactions.

It is also feasible to prepare polymers which have no carboxylic acid groups therein and then introduce these groups before or after the necessary strongly dissociated, hydrophilic groups are introduced. Suitable methods of thus producing such copolymers from acrylonitrile, methacrylonitrile or the corresponding amides are described in U.S. Patent 2,678,307. By regulating the proportions of the reactants one can obtain in this way cation exchange resins having carboxylic and sulfonic acid groups in the required ratio for conversion to poly(percarboxylic acid) resins according to the invention. Still other methods of producing the starting insoluble cation-exchange resins with carboxylic groups and highly dissociated, hydrophilic groups can also be used.

The oxidation of the carboxylic groups in the starting resin to percarboxylic acid groups can be conducted in different ways. As previously indicated, hydrogen peroxide is the preferred oxidizing agent because of its economy and convenience. Aqueous hydrogen peroxide of about 20% to about 90% concentration can be used but concentrations of about 35% to about 65% are generally preferable. At least one mole of $H_2O_2$ per carboxyl group to be converted should be used but higher ratios are also suitable. Temperatures in the range of about 10° to about 100° C. can be employed but the oxidation is usually more efficiently conducted at about 25° to about 20% to about 90% concentration can be used but to about 12 hours are ordinarily satisfactory but longer times can be used if desired. It is often advantageous to carry out the oxidation in the presence of a stabilizer which will minimize loss of hydrogen peroxide by decomposition during the oxidation. Inorganic stabilizers such as sodium stannate and/or sodium pyrophosphate or organic stabilizers of which pyridine dicarboxylic acid and 1,2-diaminocyclohexane-N,N'-tetraacetic acid are suitable examples, can be employed. To the same end it is desirable to wash the resin thoroughly with water to remove heavy metal ions before carrying out the oxidation.

Other oxidizing agents known to be useful for the conversion of the carboxylic acids to percarboxylic acids can also be used in converting the carboxylic acid groups of the resins containing highly dissociated, hydrophilic groups at least in part to percarboxylic groups. The preferred oxidizing agents are those which can be applied in the liquid phase.

The following examples illustrate in more detail some of the ways in which the new poly(percarboxylic acid) resins of the invention can be produced.

*Example 1*

A series of percarboxylic acid-sulfonic acid resins was made by copolymerizing ethyl acrylate, styrene and divinylbenzene in different proportions followed by sulfonation, hydrolysis and oxidation of carboxyl to percarboxylic acid groups.

The polymerization was carried out in a 2000 ml. three-neck flask equipped with reflux condenser, mechanical stirrer (driven by compressed-air motor), and the thermometer. The flask was filled with 1500 ml. distilled water and placed in an oil bath at 90° C. The stirrer was started, and gelatin and talc were added in amount of 1.5 to 2.0 grams each.

The polymerization mixture was then made up from ethylacrylate (destabilized by distillation), styrene and divinylbenzene (both destabilized by percolation through a small silica gel column). The monomers had been destabilized immediately prior to polymerization. Benzoyl peroxide (1.1 grams in each case) was dissolved in the mixture. The amounts of the monomers were as follows:

| Resin | Ethyl acrylate | | Styrene | | Divinyl benzene | |
|---|---|---|---|---|---|---|
| | Ml. | Mole percent | Ml. | Mole percent | Ml. | Mole percent |
| 1 | 50 | 49 | 40 | 43 | 20 | 8 |
| 2 | 65 | 62 | 30 | 32 | 15 | 6 |
| 3 | 80 | 76 | 15 | 18 | 15 | 6 |
| 4 | 100 | 93 | | 3 | 10 | 4 |

The polymerization mixture was added to the reaction flask after the temperature in the flask had reached 90° C. After 4 hours at this temperature the flask was removed from the bath and allowed to cool. The polymer was separated from the aqueous phase by filtration and was thoroughly washed on the filter with water. Most of the polymer (65–90%) was obtained in the form of spherical beads. A small amount of spongy polymer was discarded. The beads were air-dried.

The copolymer beads (about 60 g.) were stirred overnight with dichloroethane (ca. 600 ml.). This causes the beads to swell and reduces fracturing upon sulfonation. The flask with the slurry was then transferred to an ice bath, and chlorosulfonic acid (ca. 60 ml.) was added dropwise under continuous stirring. The flask was then heated in an oil bath for 3 hours at 80° C. Now the flask was cooled in an ice bath and the contents were poured into ice water (ca. 1600 ml.). Dichloroethane was driven off by passing steam through the slurry. The beads were separated from the aqueous phase and were thoroughly washed with ethanol (ca. 4 liters) on a Buchner funnel.

Prior to oxidation all resins were conditioned by repeated ion exchange cycles with alternately 1 M NaOH and 1 M HCl (ca. 4 liters per 100 gram resin per cycle, 10 cycles) and washing with distilled water (ca. 8 liters per 100 gram resin) after each conversion. The conditioning was carried out on a Buchner funnel in such a way that the resin never became dry. The conditioned resins were stored under 0.1 M HCl.

The resin (ca. 3 g.) was washed with deionized water, centrifuged to remove adherent liquid and weighed in a stoppered weighing bottle. The resin was then transferred into a 250 ml. Erlenmeyer flask. 150 ml. 45% w. aqueous $H_2O_2$, 2 ml. of 1,2-diaminocyclohexane-N,N'-tetraacetic acid as stabilizer, and 2 ml. 0.1 M $H_2SO_4$ (for neutralizing the $NH_3$ in the stabilizer solution) were added. The flask was placed in a water bath and kept at 45° C. for 24 hours. The aqueous phase was now decanted, and the resin was washed on a filter with ca. 100 ml. cold methanol (minus 10° C.). Then the resin was stirred for ca. 5 min. with 20–25 ml. cold methanol and was again washed on a filter with cold methanol until the effluent was free of $H_2O_2$. The methanol treatment removes sorbed $H_2O_2$ and most of the sorbed water without significant reversion of the percarboxylic group formation. The resins produced had the following characteristics:

| Resin | Ion exchange capacity (meq. per gram of unconverted resin in dry H+ Form) | | Oxidation capacity (meq.—COOOH per gram of unconverted resin in dry H+ form)* | Conversion of carboxyl groups to percarboxylic acid groups, percent |
|---|---|---|---|---|
| | Carboxylic acid groups | Sulfonic acid groups | | |
| Shellox 1 | ca. 1.2 | 4.4 | 0.8 | 65 |
| Shellox 2 | 3.1 | 3.3 | 1.5 | 49 |
| Shellox 3 | 5.5 | 3.3 | 1.7 | 31 |
| Shellox 4 | 5.5 | 2.9 | 2.0 | 36 |

* Measured by oxidation of iodide ion to iodine by the Kingzett method.

These poly(percarboxylic acid) resins were obtained in the form of spherical beads having colors ranging from amber (Shellox 4) to brown (Shellox 1). Their water content in the swollen H+ form was 48 (Shellox 1) to 58 (Shellox 4) percent by weight. They involve no explosion hazard; all attempts to produce detonations of the resins with 45% $H_2O_2$ have failed. They have satisfactory mechanical stability which increases with the degree of cross-linking. No resin breakdown was observed when the Shellox resins were stored and no loss in oxidation capacity was found during 140-hour storage under methanol at −10° C.

Example II

A poly(percarboxylic acid) resin having phosphonic acid groups in place of the sulfonic acid groups is made by reacting resin No. 3 of Example I which had not been sulfonated. The finely divided, cross-linked copolymer of ethyl acrylate and styrene was suspended in an amount of liquid phosphorous trichloride approximately equal to four mole per aromatic ring in the polymer. After stirring for a short time at ambient temperature, the mixture was heated for about four hours at about 70° C. with about one part of aluminum chloride per part of starting copolymer. The resulting phosphoryl dichloride-substituted copolymer was then cooled, suspended in carbon tetrachloride, and treated with chlorine added slowly as long as the chlorine continued to be adsorbed, thus converting the phosphoryl chloride groups to phosphoryl tetrachloride groups. The copolymer was then filtered off from the liquid and thoroughly washed with acetone and then water. Before oxidation with 45% aqueous hydrogen peroxide as described in Example I, the resin was alternately treated with dilute sodium hydroxide and dilute hydrochloric acid solutions to obtain beads having an average of 0.75 phosphonic acid group per aromatic ring in the resin. In the oxidation approximately 35% of the carboxylic acid groups were converted to percarboxylic acid groups giving a resin with good oxidizing properties.

Example III

Poly(percarboxylic acid) resins which have sulfuric and phosphoric acid ester groups as the highly dissociated, hydrophilic groups in the molecule are produced by making copolymers of vinyl chloride and ethyl acrylate in a mole ratio of about 0.5:1 which are then hydrolyzed with aqueous sodium hydroxide to obtain a linear copolymer having hydroxyl and carboxylic acid groups in the ratio of about 0.5:1. One portion of the hydrolyzed resin is then treated with 80% sulfuric and the remainder with 85% phosphoric acid using about three moles of acid per mole of hydroxy group in the resin and cooling to about 20° C. The resin can then be oxidized with 45% $H_2O_2$ to convert carboxylic to percarboxylic acid groups as described in Example I. Typical products contain mole ratios of functional groups as follows:

|  | Sulfuric acid ester resin | Phosphoric acid ester resin |
| --- | --- | --- |
| Percarboxylic acid groups (mole percent) | 30 | 32 |
| Carboxylic acid groups (mole percent) | 35 | 38 |
| Acid ester groups (mole percent) | 35 | 30 |

The advantages of the new poly(percarboxylic acid) resins are shown by the following results obtained with resins made as described in the foregoing examples.

Example IV

Poly(percarboxylic acid) resin containing percarboxylic, carboxylic and sulfonic acid groups in mole ratios of 1:1.7:1.4 (Shellox 4) was placed in a series of 250 ml. Erlenmeyer flasks to each of which was added a solution of 10 ml. of cyclohexene in 100 ml. of a solvent. The flasks were placed in a temperature-controlled water bath. After various periods of reaction, samples of the supernatant solution were withdrawn and analyzed with the following results:

| Ionic form of the sulfonic acid groups of the resin * | Solvent used for dissolving the cyclohexene | Temperature, °C. | Contact time (hours) | Yield of 1,2-dihydroxy-cyclohexane based on utilization of percarboxylic acid groups of resin, percent |
| --- | --- | --- | --- | --- |
| H+ | Dioxane | 45 | 4 | 75 |
| Na+ | do | 80 | 24 | 50 |
| Na+ | Methanol | 45 | 24 | 60 |

* The carboxylic and percarboxylic acid groups were in hydrogen form.

Faster reaction is obtained when using the resin with the sulfonic acid groups in the preferred hydrogen form.

Similar reaction of a 9% wt. aqueous solution of butene-1,4-diol at 45° C. for 24 hours using the resin with the same sulfonic acid groups in sodium salt form gave a 45% yield of erythritol based on the percarboxylic acid groups of the resin which were reacted.

Example V

Peracetic acid was prepared by oxidizing anhydrous acetic acid with each of the four resins described in Example I using the method of Example IV with the sulfonic acid groups of the resin in hydrogen form. The tests were made at 45° C. using reaction times of 4 hours and all four resins were about equally effective. Typical results were as follows:

| Resin | Solvent | Concentration of solution, percent | Yield of peracetic acid based on utilization of the percarboxylic acid groups of the resin, percent |
| --- | --- | --- | --- |
| Shellox 1 | None | | 75 |
| Shellox 4 | Methanol | 67–97 | 60–70 |
| Shellox 2 | do | 50 | 80 |
| Shellox 3 | do | 50 | 60 |

The peracetic acid solutions obtained were essentially free of water and hydrogen peroxide which is an important advantage not obtainable by the usual methods of percarboxylic acid manufacture when employing low concentration (45% wt.) aqueous hydrogen peroxide which was the starting material in the present case.

Other carboxylic acids which can be oxidized to percarboxylic acids in an analogous manner using the new resins of the invention are, for instance, formic acid, chloroacetic acid, propionic acid, benzoic acid, cyclohexanecarboxylic acid, phthalic, isophthalic and terephthalic acid, salicylic acid and the like. Acids which are not liquid at the reaction temperature are oxidized in a suitable inert organic solvent such as chloroform, carbon tetrachloride, etc. In all cases more advantageous percarboxylic acid products are obtained because the oxidation is carried out in the absence of water or hydrogen peroxide. Dilute aqueous hydrogen peroxide which is relatively inexpensive can nevertheless be used as starting material since the oxidation of the carboxylic acid groups of the resin is carried out as a separate step from the oxidization with the percarboxylic acid resin.

The same advantages are obtained in carrying out other oxidation reactions with the new resins as a two step process in which the resin is first oxidized to the parcarboxylic acid form and the latter is used as essentially the sole oxidizing agent. In this way any of the ethylenic compounds known to be epoxidizable and/or hydroxylatable by percarboxylic acids can be reacted. Suitable ethylenic compounds which can be employed in this method are disclosed, for example, by Swern in Chemical Reviews, vol. 45, pages 1–68 (1949), and in U.S. Patent 2,785,185 where reaction conditions are described which are applicable in the present process. This new two step method in which the percarboxylic acid resins can be reused in succeeding cycles is an important feature of the invention.

It will thus be seen that the invention offers many advantages and is capable of wide variation not only with respect to the types of new poly(percarboxylic acids) which can be made but also in regard to the improved reactions which can be carried out therewith. The invention will therefore be recognized as not restricted to the examples of its embodiments which have been given by way of example, nor is it to be limited by any theory proposed in explanation of the improved results which are obtained.

I claim as my invention:

1. A water-insoluble, cross-linked resin having a hydrogen peroxide-resistant matrix to which is attached strongly dissociated, hydrophilic acid groups and carboxylic acid groups, the said strongly dissociated, hydrophilic acid groups being in sufficient proximity to the carboxylic acid groups to cause the resin to swell in the vicinity of these carboxylic acid groups when in aqueous hydrogen peroxide solution so such solution can penetrate to said carboxylic acid groups, the said strongly dissociated hydrophilic acid groups and carboxylic acid groups being in a mole ratio of at least 0.1:1 but not greater than 4:1, and at least 20% of said carboxylic acid groups being percarboxylic acid groups (—COOOH).

2. A water-insoluble, cross-linked resin having a hydrocarbon matrix to which is attached strongly dissociated acid groups having in the free acid form an acidity at least as strong as that of an acid of pK 4, carboxylic acid and percarboxylic acid groups, the said acid groups being in sufficient proximity to each other so the strongly dissociated acid groups cause the resin to swell in the vicinity of said carboxylic acid groups when in hydrogen peroxide solution whereby said solution can penetrate to said carboxylic acid groups, the mole ratio of said strongly dissociated acid groups to the total of said carboxylic acid and percarboxylic acid groups being between 0.1:1 and 4:1 and the mole ratio of said percarboxylic acid groups to said carboxylic acid groups being at least 0.25:1, at least a portion of said strongly dissociated acid groups being in the form of a salt of the group consisting of alkali metal, alkaline earth metal and ammonium salts.

3. A water-insoluble, cross-linked resin in accordance with claim 2 having a hydrogen peroxide-resistant matrix to which it attached sulfonic groups, carboxylic acid groups and percarboxylic acid groups, the mole ratio of sulfonic acid groups to carboxylic groups being about 0.2:1 to about 1:1 and the mole ratio of said percarboxylic acid groups to said carboxylic acid groups being at least 0.25:1.

4. A resin in accordance with claim 3 wherein the resin is a sulfonated, hydrolyzed and oxidized cross-linked copolymer of an acrylic ester and a mono-vinyl hydrocarbon of the benzene series, at least a portion of the sulfonic groups being in the form of a salt of the group consisting of alkali metal, alkaline earth metal and ammonium salts.

5. A water-insoluble particulate resin in accordance with claim 3 which is a sulfonated and hydrolyzed copolymer of an alkyl acrylate and styrene in a mole ratio of 1:1 to 3 to 7 with about 3 to 15 mole percent of divinylbenzene, in which about 0.1 to about 1 sulfonic acid group is present per benzene ring.

6. A water-insoluble, cross-linked resinous poly(percarboxylic acid) in accordance with claim 3 having a polymethylene chain to which are attached sulfophenyl groups,

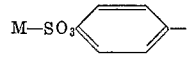

where M represents a cation, and carboxyl groups in the mole ratio of about 0.3:1 to about 0.6:1, said carboxyl groups being percarboxylic acid groups (—COOOH) and carboxylic acid groups (—COOH) in a mole ratio of about 0.5:1 to about 1.5:1.

7. A water-insoluble, cross-linked resinous poly(percarboxylic acid) in accordance with claim 2 having a hydrocarbon matrix to which are attached phosphonic acid groups and carboxyl groups in the mole ratio of about 0.3:1 to about 0.6:1, said carboxyl groups being percarboxylic acid groups (—COOOH) and carboxylic acid groups (—COOH) in a mole ratio of about 0.5:1 to about 1.5:1.

8. A water-insoluble, cross-linked resinous poly(percarboxylic acid) in accordance with claim 2 having a hydrocarbon matrix to which are attached sulfuric acid ester groups and carboxylic groups in the mole ratio of about 0.3:1 to about 0.6:1, said carboxyl groups being percarboxylic acid groups (—COOOH) and carboxylic acid groups (—COOH) in a mole ratio of about 0.5:1 to about 1.5:1.

9. A water-insoluble, cross-linked resinous poly(percarboxylic acid) in accordance with claim 2 having a hydrocarbon matrix to which are attached phosphoric acid ester groups and carboxylic groups in the mole ratio of about 0.3:1 to about 0.6:1, said carboxyl groups being percarboxylic acid groups (—COOOH) and carboxylic acid groups (—COOH) in a mole ratio of about 0.5:1 to about 1.5:1.

References Cited by the Examiner

UNITED STATES PATENTS

| | | | |
|---|---|---|---|
| 2,678,307 | 5/1954 | Ferris et al. | 260—79.3 X |
| 2,814,641 | 11/1957 | Phillips et al. | 260—502 |
| 2,877,266 | 3/1959 | Korach | 260—502 |
| 2,910,504 | 10/1959 | Hawkinson | 260—502 |
| 2,911,391 | 11/1959 | Vandenberg | 260—877 X |
| 3,133,030 | 5/1964 | Wheaton et al. | 260—79.3 |

OTHER REFERENCES

Bauman: Reactions of Hydrogen Peroxide and Ion Exchange Resins (NSA), DP–477, AEC Research and Development Report, April 1960.

JOSEPH L. SCHOFER, *Primary Examiner.*

HAROLD N. BURSTEIN, *Examiner.*

J. C. MARTIN, D. K. DENENBERG,
*Assistant Examiners.*